United States Patent
Monning et al.

(10) Patent No.: US 6,227,575 B1
(45) Date of Patent: May 8, 2001

(54) APPARATUS FOR THE CONNECTION OF LINE SECTIONS

(75) Inventors: Karl-Heinz Monning, Essen; Ralph Becker, Krefeld; Paul Wolfert, Erkrath; Helmut Pollak, Mülheim an der Ruhr; Holger Kern, Rheinberg; Michael Wechsung, Mülheim an der Ruhr; Andreas Ulma, Mülheim an der Ruhr; Heinz Dallinger, Mülheim an der Ruhr, all of (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/472,227

(22) Filed: Dec. 27, 1999

Related U.S. Application Data

(63) Continuation of application No. PCT/DE98/01586, filed on Jun. 9, 1998.

(30) Foreign Application Priority Data

Jun. 25, 1997 (DE) .............................................. 197 27 072

(51) Int. Cl.⁷ ...................................................... F16L 51/02
(52) U.S. Cl. ............................. 285/41; 285/187; 285/368
(58) Field of Search ............................. 285/41, 187, 298, 285/368, 302

(56) References Cited

U.S. PATENT DOCUMENTS

| | | | |
|---|---|---|---|
| 3,830,529 | * | 8/1974 | Domer .................................... 285/41 |
| 4,017,102 | * | 4/1977 | Henderson .............................. 285/41 |
| 4,045,056 | * | 8/1977 | Kandakov et al. ..................... 285/41 |
| 4,121,858 | * | 10/1978 | Schulz ................................... 285/41 |
| 4,640,532 | * | 2/1987 | Pope ...................................... 285/41 |
| 4,693,079 | * | 9/1987 | Wuensche et al. .................... 285/41 |
| 4,838,477 | * | 6/1989 | Roach et al. .......................... 285/41 |
| 5,378,016 | * | 1/1995 | Vollmer et al. ....................... 285/187 |
| 5,593,274 | * | 1/1997 | Carreno et al. ...................... 285/300 |

FOREIGN PATENT DOCUMENTS

| | | | |
|---|---|---|---|
| 1000649 | | 1/1957 | (DE) . |
| 2537924 | * | 3/1977 | (DE) .................................... 285/41 |
| 2909621 | * | 9/1980 | (DE) .................................... 285/41 |

OTHER PUBLICATIONS

"Flange Seal With Rubber Washers For An Ultrahigh Vacuum" (Epifanov et al.), Instruments and Experimental Techniques, vol. 18, No. 3, Jun. 1975.

* cited by examiner

*Primary Examiner*—Eric K. Nicholson
(74) *Attorney, Agent, or Firm*—Herbert L. Lerner; Laurence A. Greenberg; Werner H. Stemer

(57) ABSTRACT

In order, in a particularly simple way, to allow multiple separation and connection of line sections of a line, through which a hot and highly compressed medium flows, in particular a pipeline, through which steam flows, there is provided a double-walled flanged connection. The double-walled flange connection is formed of an outer flange and an inner flange, between which an interspace, through which a cooling medium is capable of flowing, is formed. The apparatus is particularly suitable for the connection of line sections of a steam turbine.

15 Claims, 4 Drawing Sheets

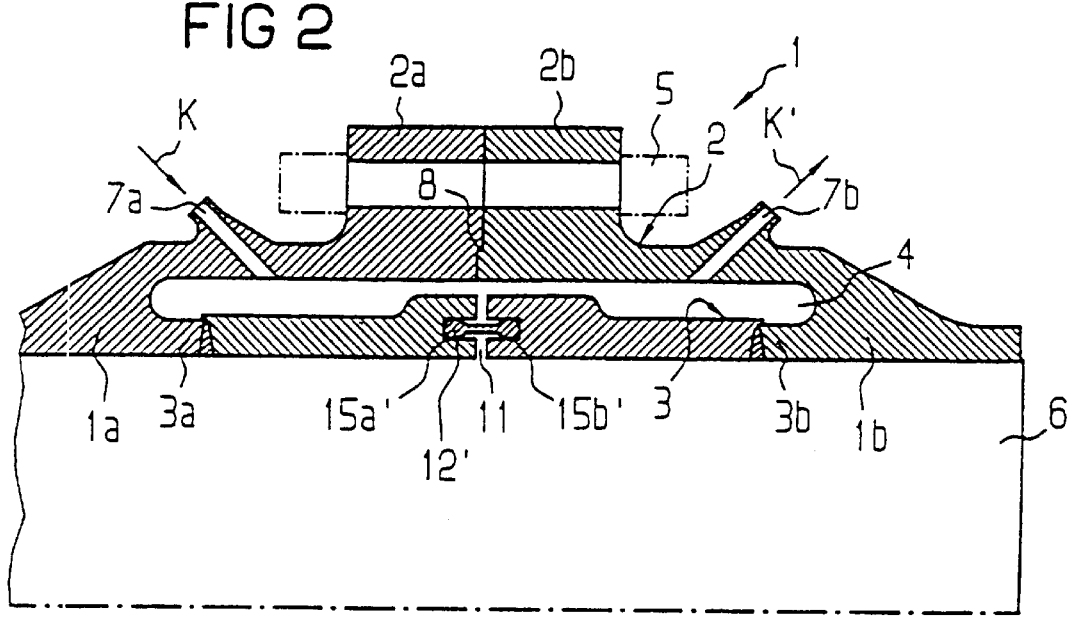
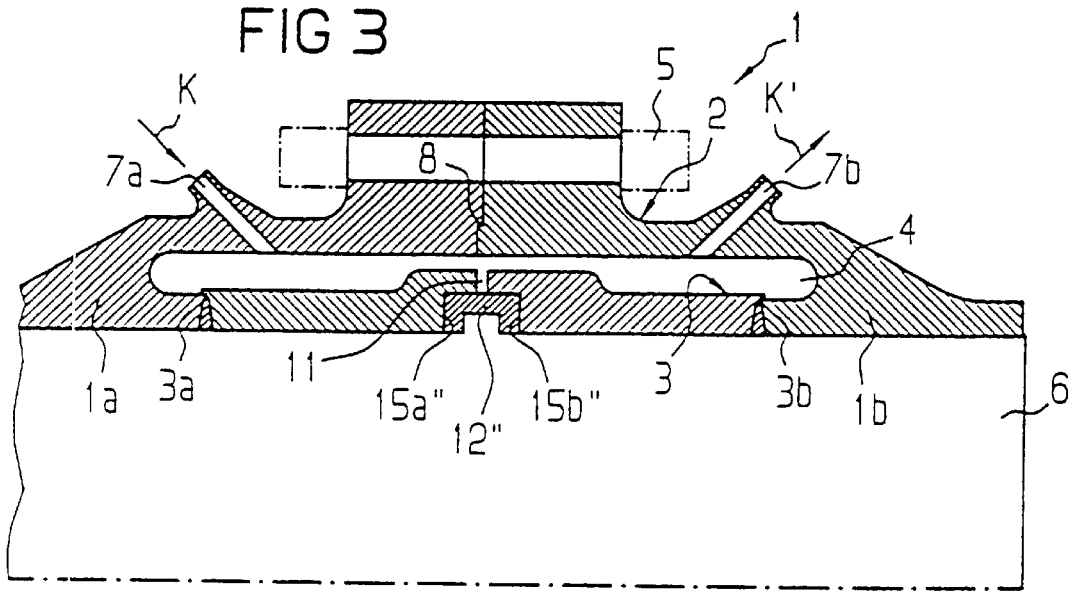

APPARATUS FOR THE CONNECTION OF LINE SECTIONS

CROSS-REFERENCE TO RELATED APPLICATION

This is a continuation of copending International Application PCT/DE98/01586, filed Jun. 9, 1998, which designated the United States.

BACKGROUND OF THE INVENTION

Field of the Invention

The invention relates to an apparatus for the connection of line sections of a line, through which a hot and highly compressed medium flows, in particular a pipeline, through which steam flows.

A steam feed line for a steam turbine is conventionally constructed for a steam temperature of more than 500° C. and for a steam pressure of more than 300 bar. In a steam feed line of this type, the connection point between a steam-feeding pipeline and a steam inlet valve is conventionally of the welded type. In order to break this connection, for example for assembly or inspection purposes on the steam turbine, the line has to be separated mechanically. In the case of a steam turbine with a steam inlet disposed above a housing parting plane, this signifies a considerable additional outlay in inspection of the steam turbine. During assembly, in addition to the time spent in welding and annealing the connection point, there is the problem of a line which is shortened due to the separating cut, so that undesirable mechanical stresses may be introduced into the line when the connection is made again.

Due to a very high transfer of heat through the hot medium into the flange as a consequence of operation, the use of a conventional flanged connection at this point leads to inadmissible thermal stress within the flange and, in particular, in the region of the flange screws. Since the flange screws are subjected to extreme thermal loading, they may relax to a high degree. The relaxation of the flange screws leads, in turn, to an undesirable loss of force exerted on the parting plane, so that the latter often can no longer be kept closed against the high pressure of the medium flowing through the line.

SUMMARY OF THE INVENTION

It is accordingly an object of the invention to provide an apparatus for the connection of line sections which overcomes the above-mentioned disadvantages of the prior art devices of this general type.

With the foregoing and other objects in view there is provided, in accordance with the invention, an apparatus for connecting line sections of a line through which a hot and highly compressed medium flows, including a double-walled flanged connection having an outer flange and an inner flange, the outer flange and the inner flange defining an interspace there-between through which a cooling medium can flow.

The cooling medium flows through the interspace in order to cool the outer flange.

By subjecting the interspace to a cooling medium, for example air, water or steam, in practice an insulating cushion is produced within the flanged connection. A line system provided for the cooling medium may then also be used for intermediate suction extraction that is often provided in a steam feed line of this type. Likewise, in an existing steam turbine plant, intermediate suction extraction may be utilized for flange cooling.

The flange parts to be connected to one another on the end face are formed by a U-shaped collar contour for fitting a respective line section. For positive and non-positive connection, the flange outer wall or the outer flange of the flanged connection is merely screw-connected by a number of flange screws disposed, distributed, on the circumference the flange. In this case, the two mutually opposite outer flange sections are advantageously provided, on the end face, with corresponding shoulder or step contours, so that the two flange parts are always in alignment with one another. This makes it considerably easier to assemble the flange parts.

By contrast, the flange inner wall or the inner flange is expediently configured to be thermally movable. The thermally movable connection of the two inner flange sections may be configured, for example, in a simple form as a tongue-and-groove connection. In this case, an I-ring connection, with an I-shaped compensating or sealing ring inserted into corresponding axial grooves of the inner flange sections, or a piston-ring-like connection of the inner flange, with engagement over (behind) the inner flange sections, is particularly expedient.

Preferably, however, an angle ring connection is provided, which allows movements of the inner flange sections relative to one another in different directions of movement. For this purpose, a sealing and compensating ring of L-shaped cross-section, which can absorb expansions and, at the same time, has a sealing effect, is expediently provided. This compensating ring allows relative movements of the two mutually opposite inner flange sections both in the longitudinal direction of the line and transversely to the longitudinal axis of the latter.

The compensating ring is expediently held on one of the inner flange sections by a threaded ring. For this purpose, when the threaded ring is in the screwed-in state, a radial annular groove for receiving one leg of the compensating ring is configured between the corresponding inner flange section and a shoulder contour of the threaded ring. An axial annular groove of the opposite inner flange section serves for receiving the other leg of the compensating ring. By virtue of these mutually perpendicular expansion joints or expansion grooves, corresponding relative movements in two mutually perpendicular directions are possible. In this case, the compensating ring is held in the grooves so as to execute a sliding movement with little play. This type of connection or sealing by use of an L-ring connection is particularly advantageous in the case of high differential expansions and pronounced relative movements between the inner flange sections in the radial direction.

Alternatively, a U-ring connection, with a U-shaped compensating or sealing ring inserted into corresponding shoulder-like recesses of the inner flange sections, may also be provided. The use of a U-ring connection is particularly suitable in the case of short inner flange sections and when there is a risk of scaling.

The advantages achieved by the invention are, in particular, that, by use of a double-walled flanged connection, with a cooling system being configured between an outer flange and an inner flange in the form of an interspace through which a cooling medium flows, a line of this type can be separated and reconnected many times in a simple way.

The line may therefore be configured for maximum steam states (300 bar/600° C.). Owing to the fact that the interspace has flowing through it a cooling medium, which is preferably supplied and discharged via lead-throughs provided in the flange outer wall, the heat from the flanged connection can be discharged in a simple reliable way. Inadmissibly high thermal and/or mechanical loading on the flange screws is thereby reliably avoided.

Other features which are considered as characteristic for the invention are set forth in the appended claims.

Although the invention is illustrated and described herein as embodied in an apparatus for the connection of line sections, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWINGS

FIGS. 2 to 4 are sectional views of alternative embodiments of the flanged connection with an I-ring connection, a U-ring connection and a piston-ring connection, respectively.

DESCRIPTION OF THE PREFERRED EMBODIMENTS

Figure 1:
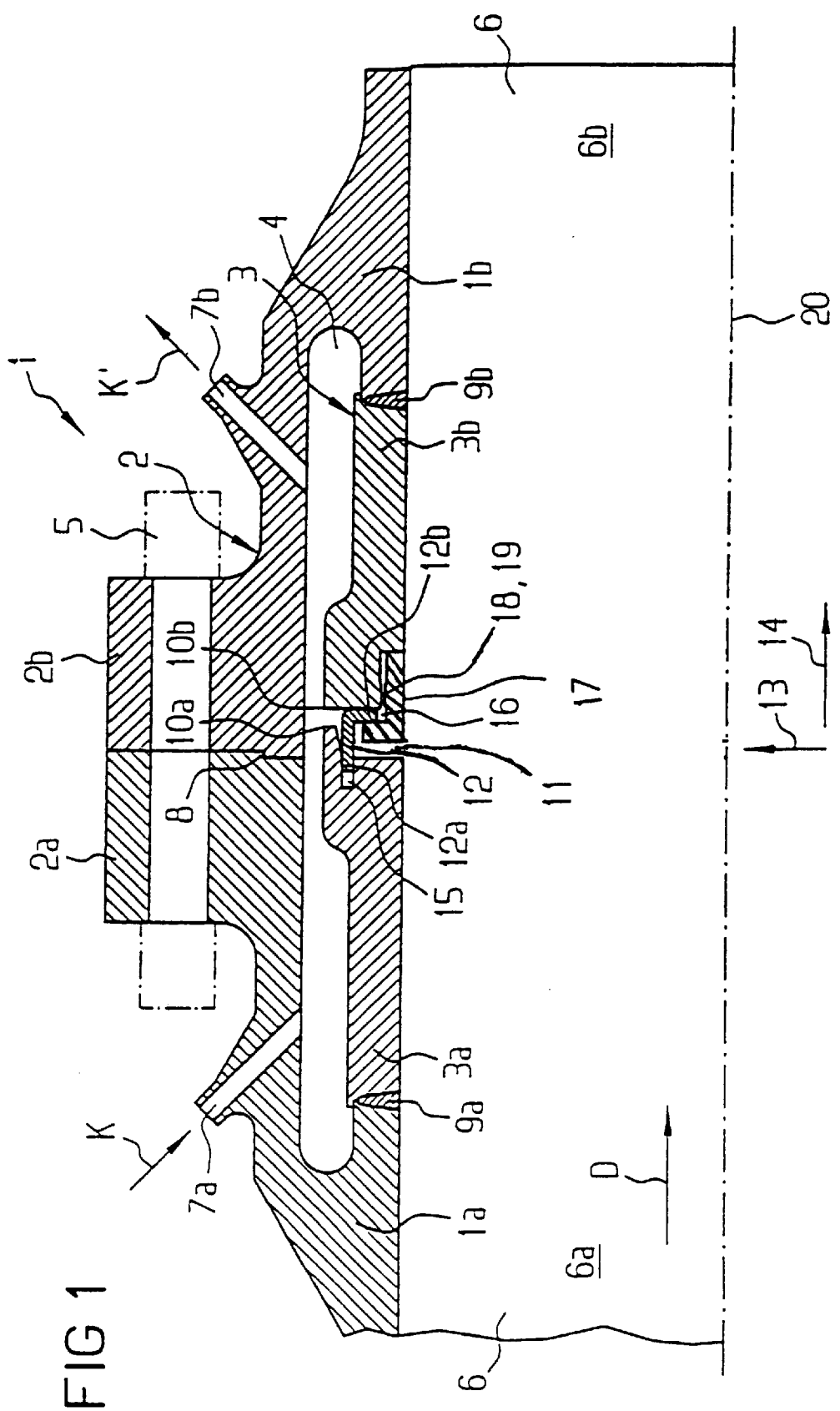
FIG. 1 is a diagrammatic, longitudinal-sectional view of a double-walled flanged connection with an L-ring connection according to the invention.

In all the figures of the drawing, sub-features and integral parts that correspond to one another bear the same reference symbol in each case. Referring now to the figures of the drawing in detail and first, particularly, to FIG. 1 thereof, there is shown a double-walled flanged connection 1 with an outer flange 2 and with an inner flange 3, between which an interspace or a cooling chamber 4 is formed. The outer flange 2 is screw-connected by flange screws 5, of which only one of the flange screws 5 can be seen. A flange part 1a, integrally formed on a first line section 6a of a pipeline 6, and the second flange part 1b, integrally formed on a second line section 6b, have a U-shaped collar profile with an outer flange section 2a, 2b and with an inner flange section 3a, 3b. In order to achieve alignment between the two flanged parts 1a and 1b when the flanged connection 1 is being made, the two outer flange sections 2a and 2b each have, on an end face, one shoulder contour 8 which in each case corresponds to the other.

A passage bore with a lead-through 7a or 7b connected to the interspace 4 is provided in each outer flange portion 2a, 2b of the outer flange 2. In order to cool the outer flange 2, a cooling medium K, preferably steam, is led into the interspace 4 via the lead-through 7a serving as a coolant inlet. The coolant K', heated there by indirect heat exchange on the inner flange 3 with hot steam D conveyed via the pipeline 6, leaves the interspace 4 via the lead-through 7b serving as a coolant outlet. Relaxation of the flange screws 5 is reliably avoided in a simple way by use of a cushion that is thus produced.

For manufacturing reasons, the inner flange sections 3a and 3b of the inner flange 3 are expediently attached to the respective line sections 6a and 6b at welds 9a and 9b. They may, however, also be integrally formed in one piece. The free ends 10a and 10b on the end faces of the inner flange sections 3a and 3b, the free ends 10a, lob facing away from the respective welds 9a, 9b, are located opposite one another, so as to form an annular gap 11.

The region of connection of the inner flange 3, the region of connection being formed by the free ends 10a, 10b on the end faces of the inner flange sections 3a and 3b, is configured to be thermally movable due to the use of a ring connection. For this purpose, in the exemplary embodiment according to FIG. 1, a compensating ring 12 of L-shaped cross-section is provided in the manner of an angle-ring connection. The compensating ring 12 closes in a steam-tight manner the annular gap 11 between the inner flange sections 3a and 3b located opposite one another on the end faces. The L-shaped compensating ring or sealing ring 12, due to its special configuration, allows a relative movement of the mutually opposite inner flange sections 3a, 3b both in a radial direction of movement 13 and in an axial direction of movement 14. In this case, one leg 12a of the compensating ring 12 is held axially movably in an axial groove 15 of the inner flange section 3a, while the other leg 12b of the compensating ring 12 is held radially movably in a radial groove 16 of the inner flange section 3b.

The compensating ring 12 is held on the inner flange section 3b by a threaded ring 17. For this purpose, the threaded ring 17, having an L-shaped collar contour, is provided with an external thread 18 that is in engagement with a corresponding threaded section 19 on the inside of the inner flange section 3b. The play of the radial groove 16 can be adjusted by rotating this threaded ring 17 along the thread 18, 19.

The compensating ring 12 thus ensures a thermally movable connection of the mutually opposite inner flange sections 3a, 3b, with freedom of movement both along a longitudinal axis 20 of the pipe and transversely to the longitudinal axis 20 of the latter. For this purpose, the compensating ring 12 is held with little play in the grooves 15 and 16 disposed perpendicularly to one another, in such a way that a sliding movement both in the radial direction of movement 13 and in the axial direction of movement 14 becomes possible.

Figure 4:
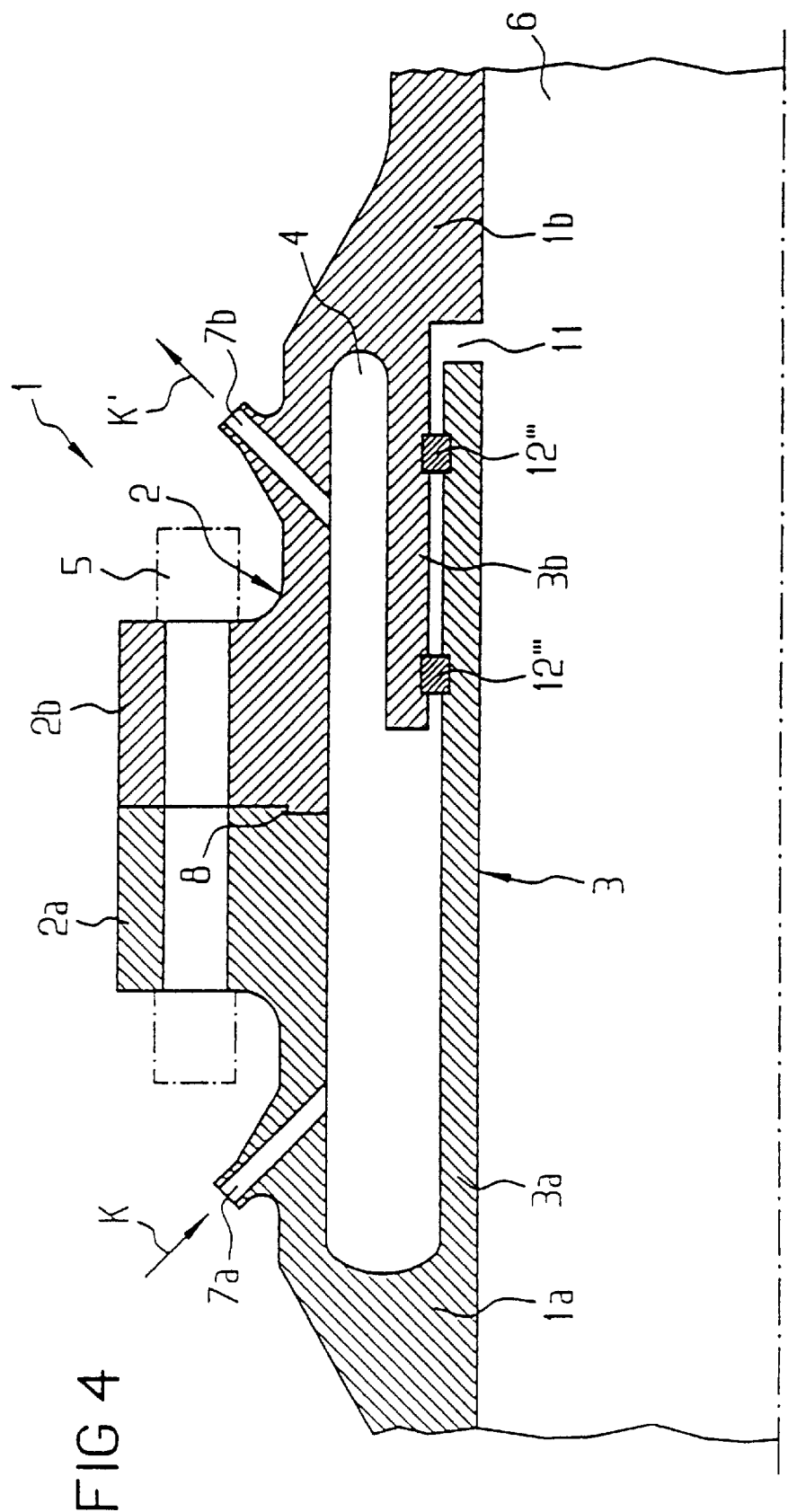

A corresponding thermally movable connection of the inner flange sections 3a, 3b is also achieved by the alternative ring connections according to FIGS. 2 to 4. For this purpose, FIG. 2 shows an I-ring connection with an I-shaped sealing or compensating ring 12' inserted into axial grooves 15a, 15b on the end faces of the inner flanges 3a and 3b. This variant is particularly simple in manufacturing terms.

FIG. 3 shows a further variant of the thermally movable connection of the inner flange sections 3a, 3b with a U-ring connection, this variant being capable of being produced particularly simply in manufacturing terms. In this case, a U-shaped sealing and compensating ring 12" is inserted into recesses 15a" and 15b" integrally formed in the end faces of the inner flange sections 3a, 3b. This variant is particularly expedient in the case of inner flange sections 3a, 3b that are short, as compared with the variant according to FIG. 1.

A variant that is modified, as compared with the configurations according to FIGS. 1 to 3, as regards the configuration of the inner flange sections 3a, 3b is shown in FIG. 4. There, the inner flange section 3a, on the left in the exemplary embodiment, is configured to be comparatively long so as to engage behind the inner flange section 3b. In this case, the inner flange section 3a engages in a gap-forming manner over the right-hand inner flange section 3b, thus forming, in conjunction with sealing rings 12''', of which there are two in the exemplary embodiment, a configuration in the manner of a piston-ring connection. This configuration of the flanged connection 1, which is asymmetric in contrast to the variants according to FIGS. 1 to 3, can likewise be produced particularly simply in manufacturing terms.

Figure 5:
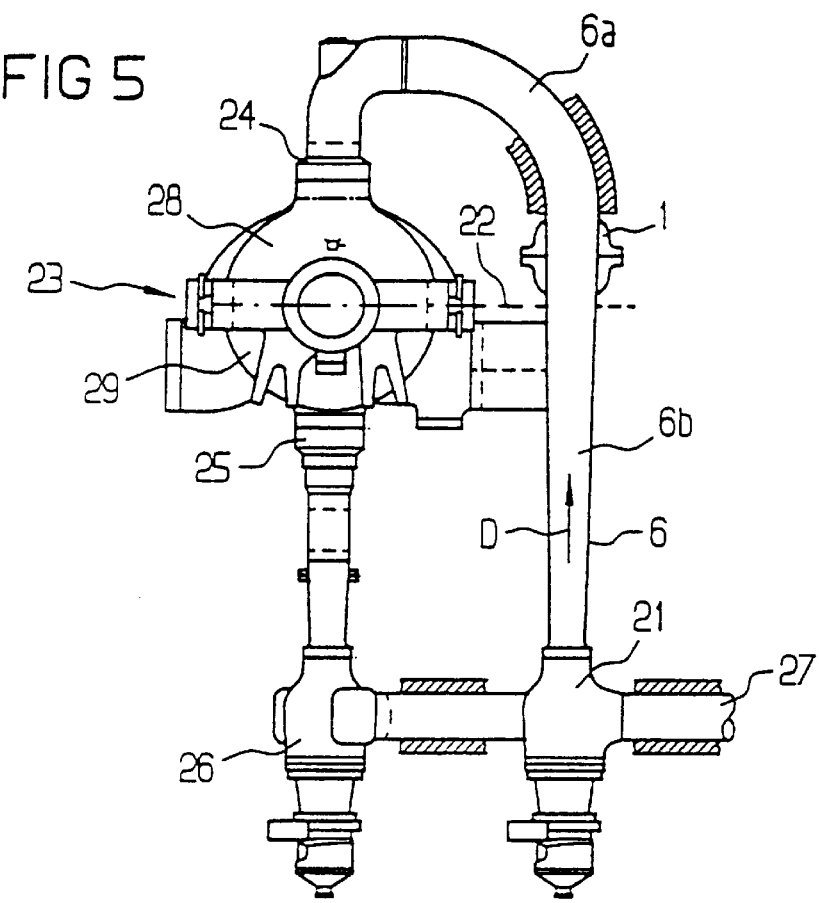
FIGS. 5 and 6 are sectional views of the flanged connection in a steam feed line of a steam turbine with a radial and a spiral inflow, respectively.

FIG. 5 shows the position of the flanged connection 1 of the pipeline 6 between a first steam inlet valve 21 and a radial inflow section 24 provided above a parting plane 22 of a steam turbine 23. A second radial inflow section 25, provided below the parting plane 22, is connected to a further steam inlet valve 26. The two steam inlet valves 21 and 26 are located in a common steam line 27.

The position or arrangement of the flanged connection 1 above the parting plane 22 of the steam turbine 23 makes it possible, in a simpler way, to raise a housing upper part 28 of the steam turbine 23, together with that line section 6a of the pipeline 6 which is located above the parting plane 22, for assembly and/or inspection purposes. In the case of such assembly, a housing lower part 29 of the steam turbine 23, together with the line section 6b of the pipeline 6 which is located below the parting plane 22, remains fixed in place. For this purpose, it is merely necessary to break and separate the flanged connection 1 which can be reconnected again in a simple way after the maintenance/repair work on the steam turbine or steam part turbine 23 has been performed.

Figure 6:
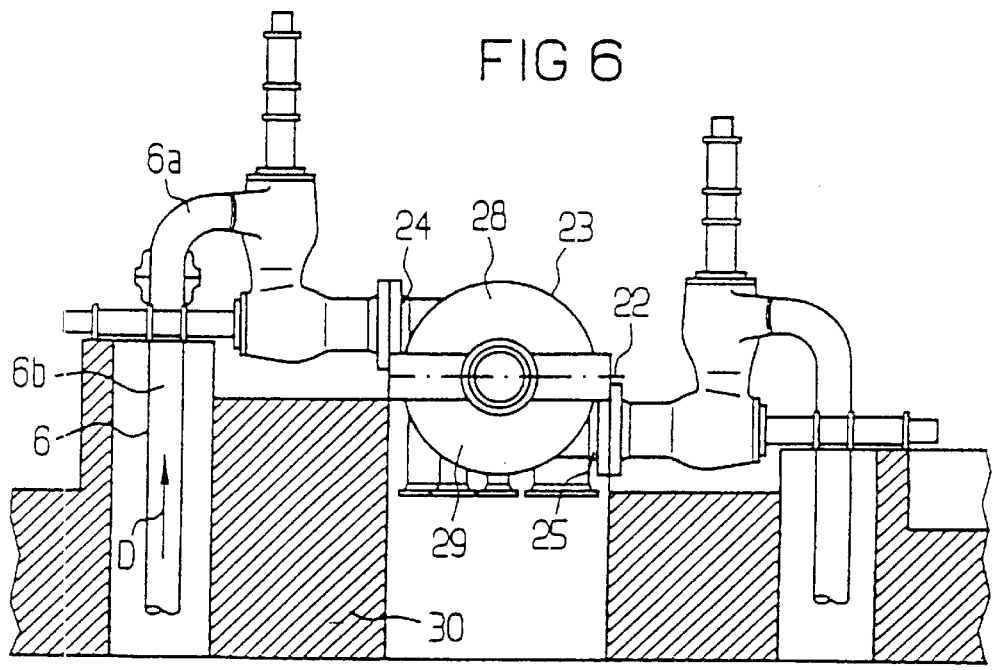

FIG. 6 shows the position of the flanged connection 1 in the case of a steam turbine 23 having a spiral inflow. In this case too, the inflow section 24 disposed laterally on the housing upper part 28, together with the line section 6a of the pipeline 6 which is located above the parting plane 22, can be removed after the flanged connection 1 has been broken and separated. When the housing upper part 28, together with the steam inlet valve 21, is lifted off, the housing lower housing part 29 of the steam turbine 23, together with the lower, likewise laterally disposed inflow section 25 and the steam inlet valve 26, once again remains fixed in place on a foundation 30 carrying the steam turbine 23.

The double-walled flanged connection 1 ensures that the hot and compressed steam D flowing through the pipeline 6 is separated from the outer flange 2 making the fixed, but breakable connection, while the steam D flows directly against the thermally movable inner flange 3. In this case, the transfer of heat into the outer flange 2 and into the flange screws 5 is considerably reduced by subjecting the interspace 4 to the cooling or blocking medium K. Since the outer flange 2 is separated spatially from the inner flange 3 which has a thermally movable connection, the introduction of pressure forces into the outer flange 2 of the flanged connection 1 in the radial direction is reduced. Moreover, the thermal loading on the outer flange 2 and therefore on the flange screws 5 is reduced.

The opening of the parting plane 22 as a result of different thermal expansions of the line sections 6a, 6b and of the flanged parts 1a, 1b and pronounced relaxation of the flange screws 5 due to high heat transfer are thus reliably avoided. Furthermore, the corresponding connection point 1, that is to say the connection between the line section 6a and 6b of the pipeline 6, can be repeatedly opened and closed in a simple way. This achieves a reduction in the inspection outlay, since there is no need to weld and anneal the connection point. Also, multiple separation and connection of the line sections 6a and 6b of the pipeline 6 can be performed in a safe and reliable manner.

We claim:

1. An apparatus for connecting line sections of a line through which a hot and highly compressed medium flows, comprising:

a double-walled flanged connection having an outer flange and an inner flange, said outer flange and said inner flange defining an interspace there-between through which a cooling medium can flow;

said inner flange being formed of inner flange sections, and including a ring connection disposed between said inner flange sections allowing said inner flange sections to be thermally movable;

said ring connection being an L-shaped compensating ring having a first leg and a second leg; and said inner flange sections including a first inner flange section having an axial groove formed therein for receiving said first leg of said L-shaped compensating ring and a second inner flange section having a radial groove formed therein for receiving said second leg of said L-shaped compensating ring.

2. The apparatus according to claim 1, wherein said outer flange has at least two lead-throughs formed therein that open into said interspace.

3. The apparatus according to claim 1, wherein:

said outer flange is formed of outer flange sections; and one of said outer flange sections and one of said inner flange sections form a flanged part having a U-shaped collar contour, and said flanged part is to be connected to a line section.

4. The apparatus according to claim 1, including a threaded ring having an L-shaped collar contour fastened to said second inner flange section for further defining said radial groove as an adjustable radial groove.

5. The apparatus according to claim 1, wherein said outer flange has outer flange sections, and including flange screws for screw-fastening said outer flange sections to one another.

6. The apparatus according to claim 1, wherein said outer flange has outer flange sections with end faces and corresponding step contours formed on said end faces.

7. An apparatus for connecting pipe sections of a pipeline through which steam flows, comprising:

a double-walled flanged connection having an outer flange and an inner flange, said outer flange and said inner flange defining an interspace there-between through which a cooling medium can flow;

said inner flange being formed of inner flange sections, and including a ring connection disposed between said inner flange sections allowing said inner flange sections to be thermally movable;

said ring connection being an L-shaped compensating ring having a first leg and a second leg; and said inner flange sections including a first inner flange section having an axial groove formed therein for receiving said first leg of said L-shaped compensating ring and a second inner flange section having a radial groove formed therein for receiving said second leg of said L-shaped compensating ring.

8. A steam turbine, comprising:

a pipeline having pipe sections through which steam flows;

a double-walled flanged connection having an outer flange and an inner flange connecting said pipe sections to each other, said outer flange and said inner flange defining an interspace there-between through which a cooling medium can flow;

said inner flange being formed of inner flange sections, and including a ring connection disposed between said inner flange sections allowing said inner flange sections to be thermally movable;

said ring connection being an L-shaped compensating ring having a first leg and a second leg; and said inner flange sections including a first inner flange section having an axial groove formed therein for receiving said first leg of said L-shaped compensating ring and a second inner flange section having a radial groove formed therein for receiving said second leg of said L-shaped compensating ring.

9. An apparatus for connecting line sections of a line through which a hot and highly compressed medium flows, comprising:

a double-walled flanged connection having an outer flange and an inner flange, said outer flange and said inner flange defining an interspace there-between through which a cooling medium can flow;

said inner flange being formed of inner flange sections, and including a ring connection disposed between said inner flange sections allowing said inner flange sections to be thermally movable; and said ring connection being a U-shaped compensating ring and said inner flange sections of said inner flange receiving said U-shaped compensating ring.

10. An apparatus for connecting line sections of a line through which a hot and highly compressed medium flows, comprising:

a double-walled flanged connection having an outer flange and an inner flange, said outer flange and said inner flange defining an interspace there-between through which a cooling medium can flow;

said inner flange being formed of inner flange sections, and including a ring connection disposed between said inner flange sections allowing said inner flange sections to be thermally movable;

said inner flange sections including a first inner flange section and a second inner flange section, said first inner flange section engaging behind said second inner flange section for forming a gap there-between, and said ring connection being disposed between said inner flange sections; and said ring connection being a plurality of ring connections disposed between said inner flange sections.

11. The apparatus according to claim 7, wherein said outer flange has at least two lead-throughs formed therein that open into said interspace.

12. The apparatus according to claim 7, wherein:

said outer flange is formed of outer flange sections; and one of said outer flange sections and one of said inner flange sections form a flanged part having a U-shaped collar contour, and said flanged part is to be connected to a line section.

13. The apparatus according to claim 7, including a threaded ring having an L-shaped collar contour fastened to said second inner flange section for further defining said radial groove as an adjustable radial groove.

14. The apparatus according to claim 7, wherein said outer flange has outer flange sections, and including flange screws for screw-fastening said outer flange sections to one another.

15. The apparatus according to claim 7, wherein said outer flange has outer flange sections with end faces and corresponding step contours formed on said end faces.

\* \* \* \* \*